(No Model.)
F. KAISER.
PIPE COUPLING.
No. 448,765. Patented Mar. 24, 1891.
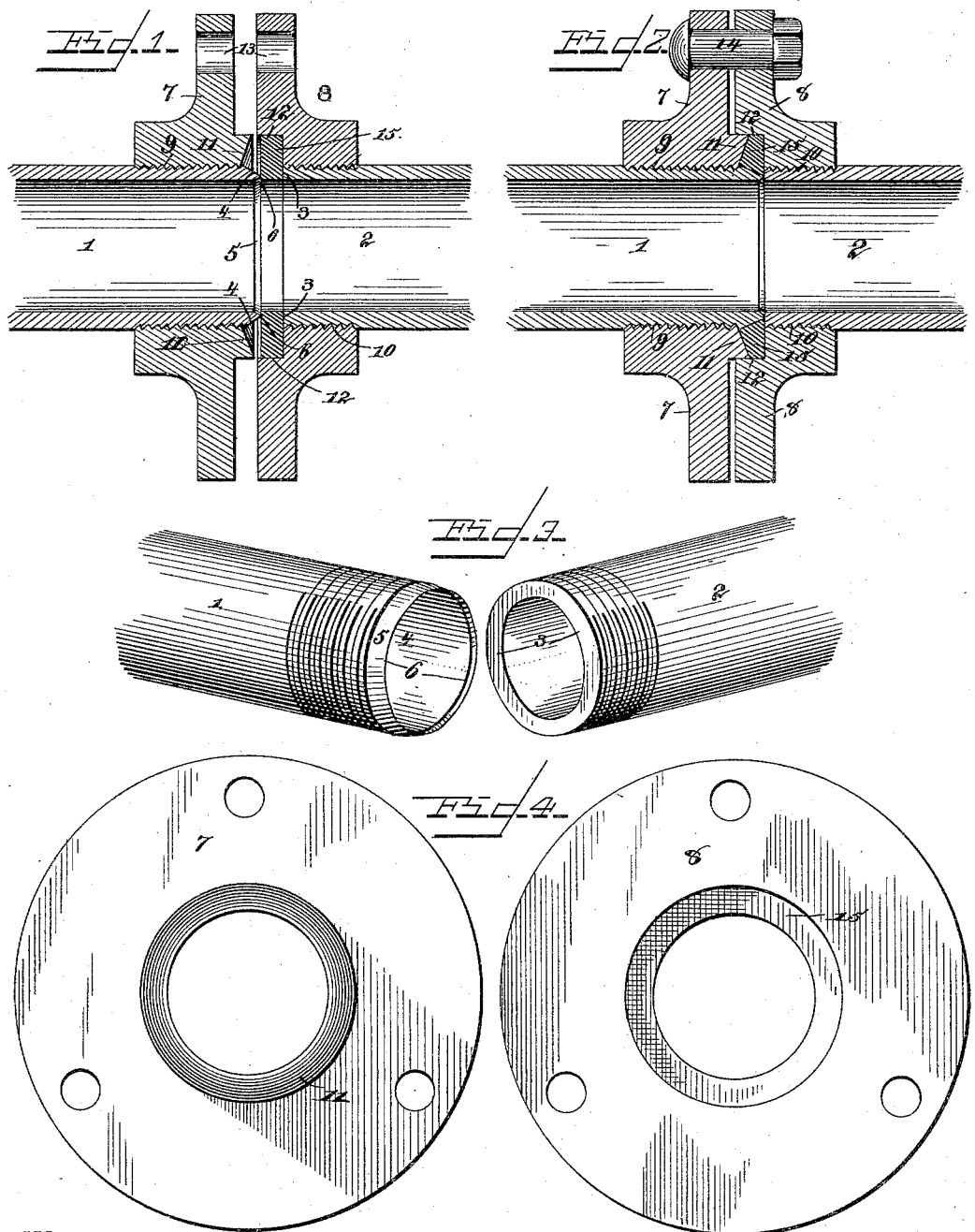
Witnesses
H. G. Dieterich
Wm. Bagger
Inventor
Fredrick Kaiser
By his Attorneys,
C. A. Snow & Co.

UNITED STATES PATENT OFFICE.

FREDRICK KAISER, OF KNOXVILLE, TENNESSEE.

PIPE-COUPLING.

SPECIFICATION forming part of Letters Patent No. 448,765, dated March 24, 1891.

Application filed January 13, 1891. Serial No. 377,629. (No model.)

*To all whom it may concern:*

Be it known that I, FREDRICK KAISER, a citizen of the United States, residing at Knoxville, in the county of Knox and State of Tennessee, have invented a new and useful Pipe-Coupling, of which the following is a specification.

This invention relates to couplings for pipes, and it has especial reference to that class of pipe-couplings which are used principally for connecting the meeting ends of wrought-iron pipes which are of even diameter throughout, terminating in thin walled ends, and which are used especially for conveying ammonia and similar gases and vapors used for refrigerating purposes, although it is equally applicable to other purposes.

The object of my invention is to construct a joint or pipe-coupling which shall be absolutely tight, so as to prevent leakage; and the invention consists in the improved construction and arrangement of parts, which will be hereinafter fully described, and particularly pointed out in the claims.

In the drawings hereto annexed, Figure 1 is a longitudinal sectional view of a joint or pipe coupling constructed in accordance with my invention, showing the same previous to the drawing together of the connecting-flanges. Fig. 2 is a longitudinal sectional view of the same, showing the joint completed by the drawing together of the connecting-flanges. Fig. 3 is a perspective view showing the meeting ends of the pipes. Fig. 4 is a plan view of the meeting ends of the two connecting-flanges.

Like numerals of reference indicate like parts in all the figures.

The pipes, which are designated by 1 and 2, are ordinary wrought-iron pipes. The end of the pipe 2 is squared off, so as to form a flat surface 3, and the end of the pipe 1 is beveled exteriorly, as at 4, and on its inner side, as shown at 5, so as to form a sharp circular edge 6.

7 and 8 designate flanges, which may be made of cast-iron, and which are provided with screw-threaded perforations 9 and 10, whereby they are mounted upon the corresponding screw-threaded ends of the pipes. The meeting faces of the flanges 7 and 8 are provided, respectively, with a collar 11 and a recess 12, and each of said flanges is provided with perforations 13 to receive bolts 14, whereby they may be connected. A washer 15, which is preferably constructed of lead, although any other suitable material may be substituted, is seated in the recess 12 of the flange 8. The upward or inner side of the collar 11 is beveled downwardly and inwardly, as shown at 16.

In operation the pipes 1 and 2 are screwed into the flanges 7 and 8, in the recess 12 of which latter the washer 15 is placed. The inner end of the pipe 2 is made flush with the bottom of the recess 12, and the beveled end of the pipe 1 is permitted to project slightly beyond the collar 11 of the flange 7. The flanges 7 and 8 are now connected by means of the bolts 14, the nuts of which are tightened, so as to draw the said flanges closely together. The collar 11 of the flange 7 will enter the recess 12 and compress the washer 15 in said recess, the beveled end of the collar 11 serving to force the material of which the washer is formed into the joints between the pipes and the flanges. At the same time the projecting sharp edge of the pipe 1 will engage the washer and cut off any superfluous portion of the latter, thus making not only a smooth but a very tight joint. By continuing to tighten the bolts 14 the sharp edge of the pipe 1 will be slightly flattened against the square end of the pipe 2, as will be seen at 17 in Fig. 2 of the drawings, thus making an exceedingly close and durable joint.

Having thus described my invention, what I claim is—

1. In a pipe-coupling, the combination, with suitable connecting-flanges and bolts connecting the said flanges, of the pipes the meeting ends of which are respectively square to form a flat shoulder or seat and beveled to form a sharp cutting-edge, and a compressible washer mounted between the meeting ends of said pipes and connecting-flanges, substantially as and for the purpose set forth.

2. In a pipe-coupling, the combination of the connecting-flanges the meeting faces of which are provided, respectively, with an annular collar having a beveled end and a recess to receive said collar, a compressible washer mounted in said recess, the pipes having their ends screwed into said flanges, one of said pipes having a squared end, forming a flat seat or shoulder, and the end of the other pipe being beveled exteriorly and interiorly to form a sharp circular edge, and the
5 connecting bolts, all arranged and operating substantially as and for the purpose set forth.

In testimony that I claim the foregoing as my own I have hereto affixed my signature in presence of two witnesses.

FREDRICK KAISER.

Witnesses:
 T. J. HINTON,
 W. L. SCOTT.